(12) United States Patent
Frushour

(10) Patent No.: US 7,517,588 B2
(45) Date of Patent: *Apr. 14, 2009

(54) HIGH ABRASION RESISTANT POLYCRYSTALLINE DIAMOND COMPOSITE

(76) Inventor: Robert H. Frushour, 2313 Devonshire, Ann Arbor, MI (US) 48104

( * ) Notice: Subject to any disclaimer, the term of this patent is extended or adjusted under 35 U.S.C. 154(b) by 578 days.

This patent is subject to a terminal disclaimer.

(21) Appl. No.: 10/940,522

(22) Filed: Sep. 14, 2004

(65) Prior Publication Data

US 2005/0079357 A1 Apr. 14, 2005

Related U.S. Application Data

(60) Provisional application No. 60/509,444, filed on Oct. 8, 2003.

(51) Int. Cl.
*B32B 9/00* (2006.01)

(52) U.S. Cl. .............. 428/408; 423/446; 427/372.2; 427/577

(58) Field of Classification Search .......... 428/408; 423/446; 427/577, 372.2
See application file for complete search history.

(56) References Cited

U.S. PATENT DOCUMENTS

| | | | |
|---|---|---|---|
| 2,077,345 A | 4/1937 | Van der Pyl | |
| 2,137,200 A | 11/1938 | Boyer | |
| 2,137,201 A | 11/1938 | Boyer | |
| 2,173,833 A | 9/1939 | Fitz-Randolph | |
| 2,238,351 A | 4/1941 | Van der Pyl | |
| 2,270,209 A | 1/1942 | Van der Pyl | |
| 2,561,709 A | 7/1951 | Norling | |
| 2,828,197 A | 3/1958 | Blackman, Jr. | |
| 2,944,323 A | 7/1960 | Stadler | |
| 2,947,610 A | 8/1960 | Hall | |
| 2,992,900 A | 7/1961 | Bovenkerk | |
| 3,087,803 A | 4/1963 | Bakian | |
| 3,141,746 A | 7/1964 | De Lai | |
| 3,192,620 A | 7/1965 | Huiziny | |
| 3,233,988 A | 2/1966 | Wentorf, Jr. | |
| 3,369,879 A | 2/1968 | Miller | |
| 3,517,464 A | 6/1970 | Mattia | |
| 3,609,818 A | 10/1971 | Wentorf, Jr. | |
| 3,637,360 A | 1/1972 | Ueltz | |
| 3,645,706 A | 2/1972 | Bovenkerk | |
| 3,743,489 A | 7/1973 | Wentorf, Jr. | |
| 3,745,623 A | 7/1973 | Wentorf, Jr. | |
| 3,767,371 A | 10/1973 | Wentorf, Jr. | |
| 3,902,873 A | 9/1975 | Hughes | |
| 3,904,391 A | 9/1975 | Lindstrom | |
| 3,913,280 A | 10/1975 | Hall | |
| 4,034,066 A * | 7/1977 | Strong et al. | 423/446 |
| 4,041,650 A | 8/1977 | Sawluk | |

(Continued)

*Primary Examiner*—Archene Turner
(74) *Attorney, Agent, or Firm*—Young Basile

(57) ABSTRACT

An apparatus and method of forming a composite body. The invention includes the steps of heating diamond crystals to a temperature about 1900° C. and simultaneously subjecting the diamond crystals to a pressure above about 40 k-bar, forming a diamond material layer having a first surface from the diamond crystals, providing a substrate, and bonding the first surface of the diamond material layer and the substrate under high pressure and high temperature. The composite body has a diamond material layer formed from diamond crystals. The diamond material layer has a first surface and a substrate. The first surface of the diamond material layer and the substrate are bonded together under high pressure and high temperature.

20 Claims, 2 Drawing Sheets

U.S. PATENT DOCUMENTS

| | | | |
|---|---|---|---|
| 4,042,673 A * | 8/1977 | Strong | 423/446 |
| 4,104,344 A | 8/1978 | Pope | |
| 4,109,737 A | 8/1978 | Bovenkerk | |
| 4,156,329 A | 5/1979 | Daniel | |
| 4,224,380 A | 9/1980 | Bovenkerk | |
| 4,225,322 A | 9/1980 | Knemeyer | |
| 4,229,186 A | 10/1980 | Wilson | |
| 4,239,501 A | 12/1980 | Wirth | |
| 4,239,502 A | 12/1980 | Slack | |
| 4,259,090 A | 3/1981 | Bovenkerk | |
| 4,260,397 A | 4/1981 | Bovenkerk | |
| 4,268,276 A | 5/1981 | Bovenkerk | |
| 4,278,448 A | 7/1981 | Ishizuka | |
| 4,311,490 A | 1/1982 | Bovenkerk | |
| 4,322,396 A | 3/1982 | Strong | |
| 4,339,896 A | 7/1982 | Dennis | |
| 4,350,215 A | 9/1982 | Radtke | |
| 4,378,233 A | 3/1983 | Carver | |
| 4,411,672 A | 10/1983 | Ishizuka | |
| 4,481,016 A | 11/1984 | Campbell | |
| 4,481,180 A | 11/1984 | Bedere | |
| 4,496,372 A | 1/1985 | Almond | |
| 4,505,721 A | 3/1985 | Almond | |
| 4,522,633 A | 6/1985 | Dyer | |
| 4,592,433 A | 6/1986 | Dennis | |
| 4,604,106 A | 8/1986 | Hall | |
| 4,626,407 A | 12/1986 | Veltri | |
| 4,629,373 A | 12/1986 | Hall | |
| RE32,380 E | 3/1987 | Wentorf, Jr. | |
| 4,661,180 A | 4/1987 | Frushour | |
| 4,662,896 A | 5/1987 | Dennis | |
| 4,670,025 A | 6/1987 | Pipkin | |
| 4,686,080 A | 8/1987 | Hara | |
| 4,705,123 A | 11/1987 | Dennis | |
| 4,716,975 A | 1/1988 | Dennis | |
| 4,776,861 A | 10/1988 | Frushour | |
| 4,784,023 A | 11/1988 | Dennis | |
| 4,789,385 A | 12/1988 | Dyer | |
| 4,802,895 A | 2/1989 | Burnand | |
| 4,828,582 A | 5/1989 | Frushour | |
| 4,866,885 A | 9/1989 | Dodsworth | |
| 4,872,377 A | 10/1989 | Frushour | |
| 4,875,907 A | 10/1989 | Phaal | |
| 4,954,139 A | 9/1990 | Cerutti | |
| 4,972,637 A | 11/1990 | Dyer | |
| 4,988,554 A | 1/1991 | Peterson | |
| 5,007,207 A | 4/1991 | Phaal | |
| 5,011,509 A | 4/1991 | Frushour | |
| 5,011,515 A | 4/1991 | Frushour | |
| 5,014,468 A | 5/1991 | Ravipati | |
| 5,032,147 A | 7/1991 | Frushour | |
| 5,049,164 A | 9/1991 | Horton | |
| 5,054,246 A | 10/1991 | Phaal | |
| 5,120,327 A | 6/1992 | Dennis | |
| 5,133,332 A * | 7/1992 | Tanaka et al. | 51/293 |
| 5,190,734 A | 3/1993 | Frushour | |
| 5,264,283 A * | 11/1993 | Waldenstrom et al. | 428/408 |
| 5,351,772 A | 10/1994 | Smith | |
| 5,355,969 A | 10/1994 | Hardy | |
| 5,379,854 A | 1/1995 | Dennis | |
| 5,449,388 A | 9/1995 | Wiand | |
| 5,451,430 A * | 9/1995 | Anthony et al. | 428/408 |
| 5,469,927 A | 11/1995 | Griffin | |
| 5,564,511 A | 10/1996 | Frushour | |
| 5,598,750 A | 2/1997 | Griffin | |
| 5,645,617 A | 7/1997 | Frushour | |
| 5,672,395 A * | 9/1997 | Anthony et al. | 427/577 |
| 5,981,057 A * | 11/1999 | Collins | 428/408 |
| 6,030,595 A * | 2/2000 | Sumiya et al. | 423/446 |
| 6,187,068 B1 | 2/2001 | Frushour | |
| 6,582,513 B1 * | 6/2003 | Linares et al. | 423/446 |
| 6,846,341 B2 * | 1/2005 | Middlemiss | 51/307 |

* cited by examiner

HIGH ABRASION RESISTANT POLYCRYSTALLINE DIAMOND COMPOSITE

CROSS REFERENCE

This application claims the benefit of the Oct. 8, 2003 filing date of U.S. Provisional Application No. 60/509,444, the entire contents of which are hereby incorporated by reference.

BACKGROUND

The present invention relates to a sintered polycrystalline diamond composite for use in rock drilling, machining of wear resistant materials, and other operations which require the high abrasion resistance or wear resistance of a diamond surface. Specifically, this invention relates to such bodies which comprise a polycrystalline diamond layer attached to a cemented metal carbide substrate via processing at ultrahigh pressures and temperatures.

It is well known to sinter a mass of crystalline particles such as diamond or cubic boron nitride in the presence of a suitable solvent catalyst by means of a high pressure, high temperature apparatus to form a compact with good particle-to-particle bonding. It is also well known that use of diamond particles smaller in size result in a compact with higher abrasion resistance when used to machine or drill certain materials such as rock. However, there is a limit as to how fine a particle size becomes useful since the impact strength and thermal stability of a compact are reduced as the diamond particle size becomes smaller. Such composite compacts are widely used in machining and drilling since the carbide substrate provides good mechanical support and can be clamped or brazed to a suitable tool holder or drilling bit.

It would be useful if the wear life of a compact could be extended without giving up impact resistance as happens with smaller diamond particle size or by having to make the diamond layer thicker which increases the stress in the compact leading to early catastrophic failure due to cracking or delamination.

SUMMARY

The present invention pertains to an apparatus and method of forming a composite body including the steps of heating diamond crystals to a temperature about 1900° C. and simultaneously subjecting the diamond crystals to a pressure above about 40 k-bar; forming a diamond material layer having a first surface from the diamond crystals; providing a substrate, and bonding the first surface of the diamond material layer and the substrate under high pressure and high temperature.

The composite body has a diamond material layer formed from diamond crystals which have been heated to a temperature above about 1900° C. and simultaneously subjected to a pressure above about 40 k-bar. The diamond material layer has a first surface and a substrate. The first surface of the diamond material layer and the substrate are bonded together under high pressure and high temperature.

BRIEF DESCRIPTION OF THE DRAWING

The various features, advantages and other uses of the present invention will become more apparent by referring to the following detailed description and drawings in which.

DETAILED DESCRIPTION

A diamond material is manufactured by chemical vapor deposition under conditions that limit nitrogen absorption into the diamond crystals. This material can be grown by any of the CVD techniques now being used, such as plasma assisted or heated filament methods. These low pressure methods of making a diamond layer are preferable since they can produce a diamond with low nitrogen content. This low-nitrogen diamond shows a higher degree of abrasion resistance than diamonds currently being manufactured by high pressure manufacturing processes. Low nitrogen diamonds can also be produced by current high pressure, high temperature technology provided a nitrogen "getter" or a nitrogen attractive material such as titanium or aluminum, is incorporated into the process. Diamond thus produced is mixed with a non-reactive material such as graphite and loaded into a high pressure, high temperature cell. The cell is then subjected to a temperature above 1900° C. and preferably of about 2300° C. and a pressure above 40 k-bar and preferably of about 55 k-bar for five minutes. After returning to room temperature and pressure, the diamond is treated with acids to wash away the graphite and crushed and sorted to various particle sizes for use in PDC manufacture. The diamond is then cleaned in a hydrogen furnace for 1 hour at 900° C. This diamond feed stock can be used by any of the well-known high pressure, high temperature manufacturing processes to produce a PDC cutter.

Figure 1:
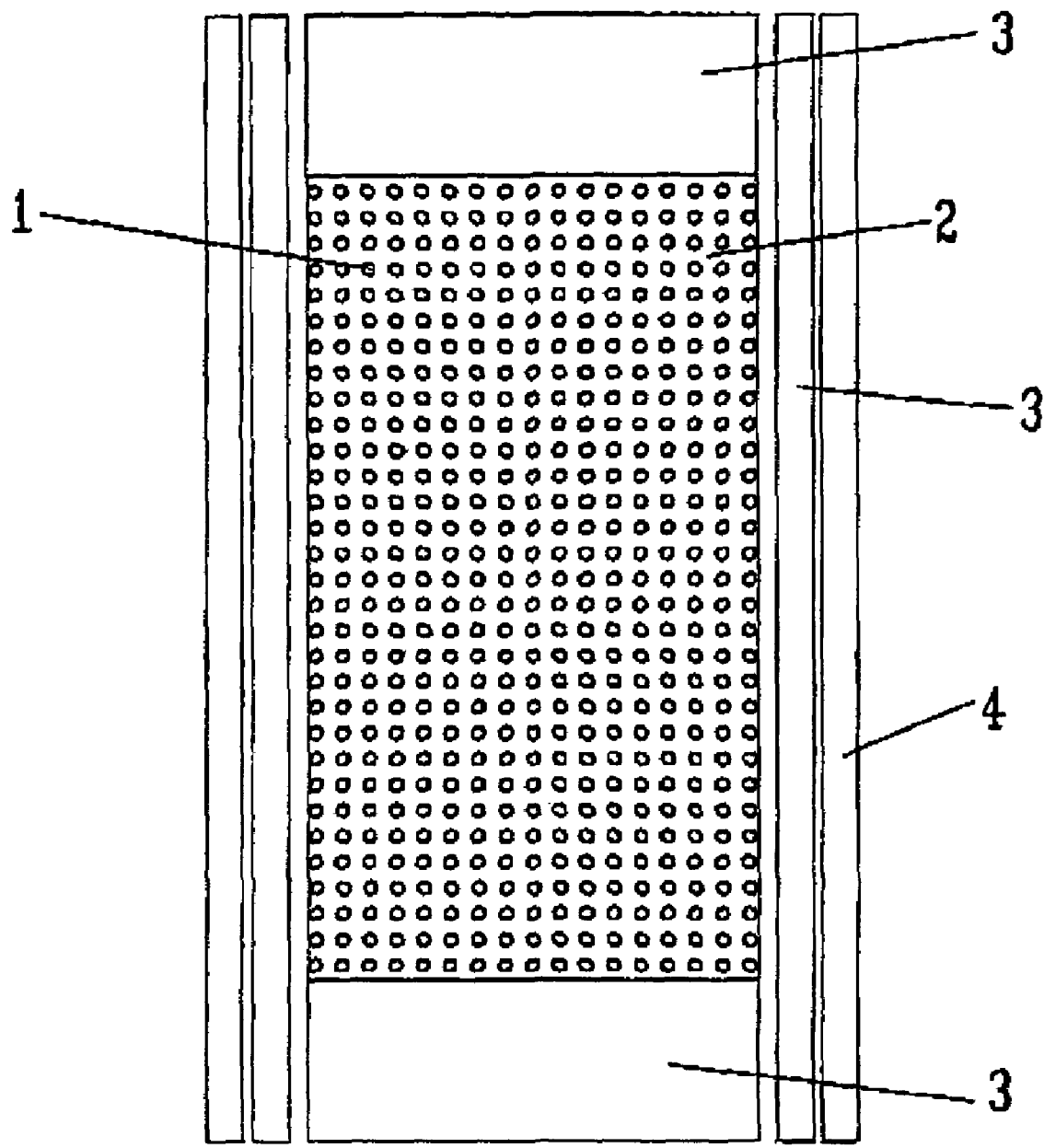
FIG. 1 is a cross-sectional view of an inner portion of a high pressure cell which may be used to treat diamond material to increase its abrasion resistance.

FIG. 1 shows a cross section of the inner portion of an assembly which may be employed to treat diamond material according to the present invention. The diamond material 1 is mixed with a non-reactive material 2 such as graphite. The mixture is placed inside a non-reactive enclosure 3 composed of a material such as salt. The heat is provided by passing an electric current through a graphite heater tube 4.

In the following description and claims, it should be understood that a cemented metal carbide substrate refers to a carbide of one of the group IVB, VB or VIB metals which is pressed and sintered in the presence of a binder of cobalt, nickel, or iron and the alloys thereof.

Figure 2:
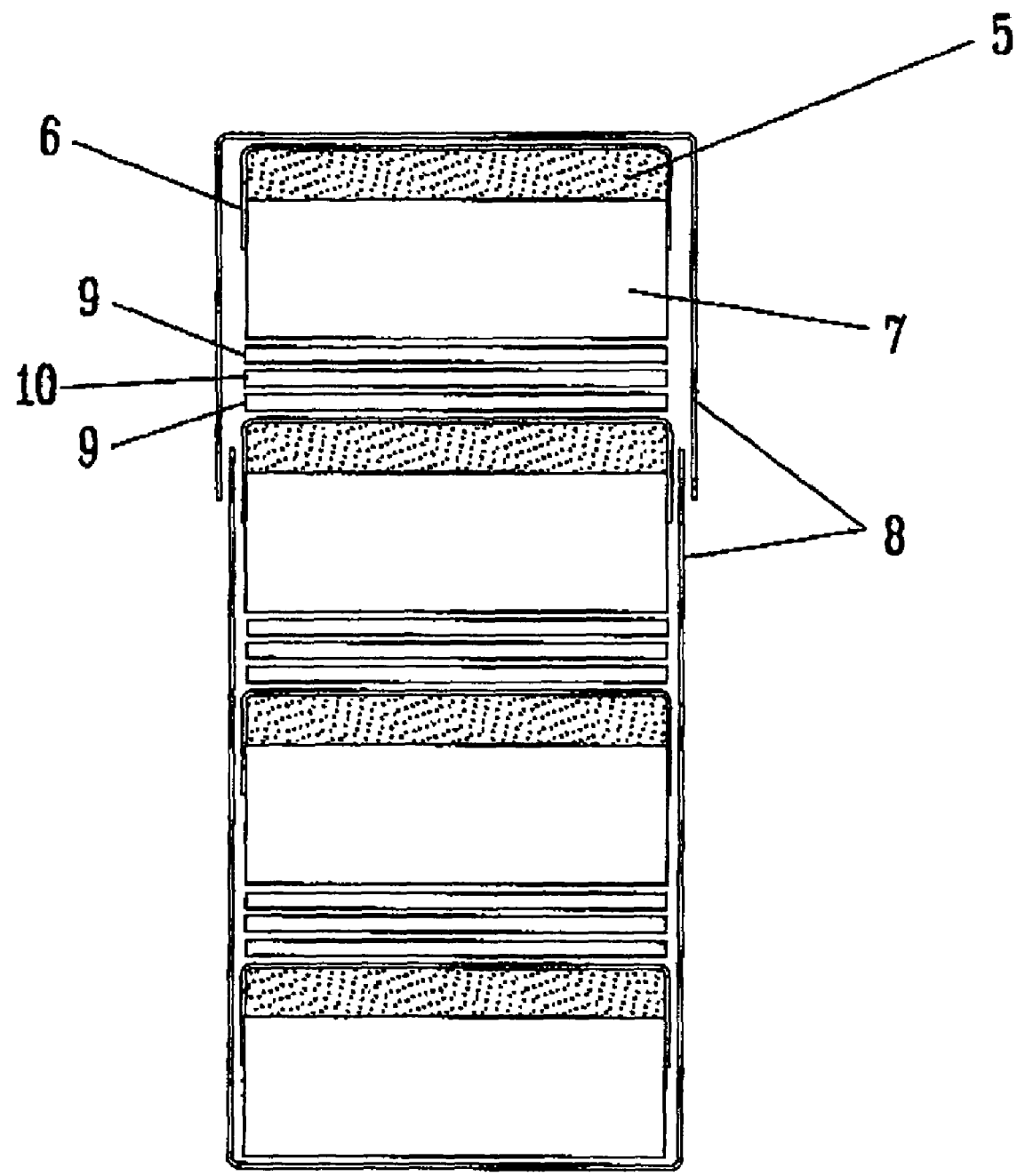
FIG. 2 is a cross-sectional view of an inner portion of a high pressure cell which may be used to make a diamond compact according to the present invention.

FIG. 2 shows a cross section of an inner portion of an assembly which may be employed to make the composite polycrystalline diamond body of the present invention.

A diamond material 5 is placed into a protective metal cup 6, then the substrate 7 is placed into the cup on top of the diamond.

An enclosure 8 is cylindrical in shape and is designed to fit within a central cavity of an ultrahigh pressure and temperature cell, such as that described in U.S. Pat. No. 3,745,623 or U.S. Pat. No. 3,913,280.

The enclosure 8 is composed of a metal, such as zirconium, molybdenum, or tantalum, which is selected because of its high melting temperature and designed to protect the reaction zone from moisture and other harmful impurities present in a high pressure and high temperature environment. The cups 6 are also made of a metal, such as zirconium, molybdenum, or tantalum, and designed to provide additional protection to the sample if the outer enclosure should fail. Discs 9 are fabricated from either zirconium or molybdenum and disc 10 is composed of fired mica, salt, boron nitride, or zirconium oxide and is used as a separator so that the composite bodies can be easily divided.

Typically, the metal carbide support 7 will be composed of tungsten carbide with a 13 weight percent cobalt binder.

The entire cell is subjected to pressures in excess of 40 K-bars and heated in excess of 1400° C. for a time of 10 minutes. Then the cell is allowed to cool enough so that the diamond does not back-convert to graphite when the pressure is released.

After pressing, the samples are lapped and ground to remove all the protective metals 6, 8 and 9.

Finished parts are mounted on tool shanks or drill bit bodies by well-known methods, such as brazing, LS bonding, mechanical interference fit, etc., and find use in such applications such as, machining high silicon aluminum, brass, composite materials, rock, or any application where excessive temperatures may result in thermal degradation of the diamond cutting edge.

EXAMPLES 100 carats of CVD diamond material with a nitrogen content of less than 1 ppm are mixed with graphite powder, then formed into a cylindrical shape to fit snugly into the salt liners of an indirectly heated high pressure, high temperature cell. The cell is loaded into a belt type high pressure apparatus and the pressure is increased to about 55 k-bars.

Electric power is then applied to the high pressure cell to raise the temperature to 2300° C. Electric power is maintained for about five minutes and then turned off. The cell is allowed to cool for about two minutes and the pressure is reduced to atmospheric pressure. The diamond-graphite sample is separated from the cell and treated 10:1 in a mixture of hot concentrated sulfuric and nitric acids to exfoliate the graphite. The remaining diamond is crushed and sized into a diamond powder with an average particle size of 25 microns. This diamond powder is then cleaned in a hydrogen atmosphere at 900° C. for one hour. The cleaned diamond thus produced is used as a feed stock to manufacture a PDC cutter by known high pressure, high temperature techniques.

What is claimed is:

1. composite body comprising:
    a substrate having a surface;
    a diamond material layer, the diamond material layer bonded to the surface of the substrate, the diamond material layer formed from existing diamond crystals, the existing diamond crystals having been heated to a temperature above about 1900° C. and simultaneously subjected to a pressure above about 40 k-bar prior to bonding to the surface of the substrate;
    wherein the bond between the diamond material layer and the substrate is achieved by high pressure and temperature.

2. The composite body of claim 1 wherein the existing diamond crystals in the diamond material body are manufactured using a CVD process.

3. The composite body of claim 2 wherein the existing diamond crystals in the diamond material layer are manufactured using high temperature carbon deposition.

4. The composite body of claim 2 wherein the existing diamond crystals in the diamond material layer are manufactured by a process whereby a nitrogen content of the diamond crystals is limited to a maximum of about 100 ppm.

5. The composite body of claim 2 wherein the existing diamond crystals in the diamond layer are manufactured by a process whereby a nitrogen content of the diamond crystals is limited to a maximum of about 10 ppm.

6. The composite body of claim 2 wherein the existing diamond crystals in the diamond layer are manufactured by a process whereby a nitrogen content of the diamond crystals is limited to a maximum of about 1 ppm.

7. The composite body of claim 2 wherein the existing diamond crystals in the diamond layer are manufactured by a process using a nitrogen attractive material to limit the nitrogen content of the diamond.

8. The composite body of claim 1 wherein the diamond material layer is composed of natural type IIA diamond crystals.

9. A composite body formed by a process including the steps of:
    diamond crystals to a temperature of about 1900° C. and simultaneously subjecting the diamond crystals to a pressure above 40 k-bar, to form a diamond material layer having a first surface from the diamond crystals;
    providing a substrate; and
    bonding the first surface of the diamond material layer thus prepared and the substrate under high pressure and high temperature, the composite body comprising:
    a. substrate; and
    b. diamond material layer bonded to the substrate, the diamond material layer having a first surface, the diamond material layer formed from existing diamond crystals, the diamond material layer that has been formed by heating the existing diamond crystals to a temperature above about 1900° C. and simultaneously subjecting them to a pressure above about 40 k-bar prior to bonding to substrate,
    wherein the first surface of the diamond material layer and the substrate are bonded together under high pressure and high temperature.

10. The composite structure of claim 1 wherein the temperature to which the existing diamond crystals are heated is between about 1900° C. and about 2300° C. to form the diamond material layer.

11. The composite structure of claim 10 wherein the pressure to which the existing diamond crystals are subjected is between 40 k-bar and 50 k-bar to form the diamond material layer.

12. The composite structure of claim 1 wherein the existing diamond crystals are mixed with a non-reactive material prior to subjecting them to elevated temperature and pressure.

13. A method of forming a composite body comprising the steps of:
    heating diamond crystals to a temperature about 1900° C. and simultaneously subjecting the diamond crystals to a pressure above about 40 k-bar;
    forming a diamond material layer having a first surface from the diamond crystals;
    providing a substrate; and
    bonding the first surface of the diamond material layer and the substrate under high pressure and high temperature.

14. The method of claim 13 wherein the step of forming the diamond material layer further comprises the step of:
    forming the diamond layer of diamond crystals that have been manufactured using a CVD process.

15. The method of claim 13 wherein the step of forming the diamond material layer further comprises the step of:
    using high temperature carbon deposition to form the diamond crystals used in the diamond layer.

16. The method of claim 13 further comprising the step of:
    manufacturing the diamond crystals for the diamond material layer by a process in which a nitrogen content of the diamond crystals is limited to a maximum of about 100 ppm.

17. The method of claim 13 further comprising the step of:
manufacturing the diamond crystals for the diamond material layer by a process in which a nitrogen content of the diamond crystals is limited to a maximum of about 10 ppm.

18. The method of claim 13 further comprising the step of:
manufacturing the diamond crystals for the diamond material layer by a process in which a nitrogen content of the diamond crystals is limited to a maximum of about 1 ppm.

19. The method of claim 13 further comprising the step of:
manufacturing the diamond crystals for the diamond material layer by a process using a nitrogen attractive material to limit the nitrogen content of the diamond crystals.

20. The method of claim 13 further comprising the step of:
forming the diamond layer of natural type IIA diamond crystals.

* * * * *